United States Patent [19]

Jeuniaux et al.

[11] Patent Number: 5,465,214
[45] Date of Patent: Nov. 7, 1995

[54] METHOD OF MEASURING THE SHAPE AND/OR THE PLANARITY OF A RUNNING MATERIAL, AND DEVICE FOR ITS IMPLEMENTATION

[75] Inventors: Francois Jeuniaux, Sancy; Marc Malhomme; Jean-Marc Moretti, both of Dunkerque; Gérard Haralamb, Dillingen, all of France

[73] Assignee: GTS Industries (Societe Anonyme), Grand Synthe, France

[21] Appl. No.: 345,766

[22] Filed: Nov. 22, 1994

[51] Int. Cl.$^6$ ............................................. G06F 19/00
[52] U.S. Cl. ............................. 364/472; 72/12; 364/562
[58] Field of Search ............................... 364/472, 469, 364/562, 563, 507; 72/10, 11, 12, 16, 8, 9, 7; 356/1, 376

[56] References Cited

U.S. PATENT DOCUMENTS

| | | | |
|---|---|---|---|
| 4,677,578 | 6/1987 | Wright et al. | 364/472 X |
| 4,726,213 | 2/1988 | Manchu | 364/472 X |
| 4,745,556 | 5/1988 | Turley | 364/472 |
| 5,267,170 | 11/1993 | Anbe | 364/472 |
| 5,373,545 | 12/1994 | Friedrich et al. | 364/472 |

FOREIGN PATENT DOCUMENTS

| | | |
|---|---|---|
| 1935742 | 1/1970 | Germany. |
| 3124297 | 1/1983 | Germany. |
| 9316353 | 8/1993 | WIPO. |

*Primary Examiner*—Joseph Ruggiero
*Attorney, Agent, or Firm*—Sixbey Friedman Leedom & Ferguson

[57] ABSTRACT

A method and device for measuring the shape and/or the planarity of a longitudinal fiber of a running strip are provided. Readings are taken of the heights ($y_i$) of a set of n points of index (i) of the said fiber, and a function (y(l)) depending on the shape of the said fiber is determined. When readings are taken of the height of the point of index (i), readings are taken simultaneously of the heights of at least two other points which are close to and located on either side of it, the curvature ($K(x)_i$) of the said fiber in the vicinity of the said point of index i is calculated approximately, and then a function (k(l)) representing the change in the curvature between the said points of index 1 and index n is determined, and, by successive integrations of (k(l)), a function (Y(l)) representing the actual shape of the said fiber between the said points of index I and index n, and the length L of the said fiber, from which its elongation ratio is calculated, are determined.

11 Claims, 1 Drawing Sheet

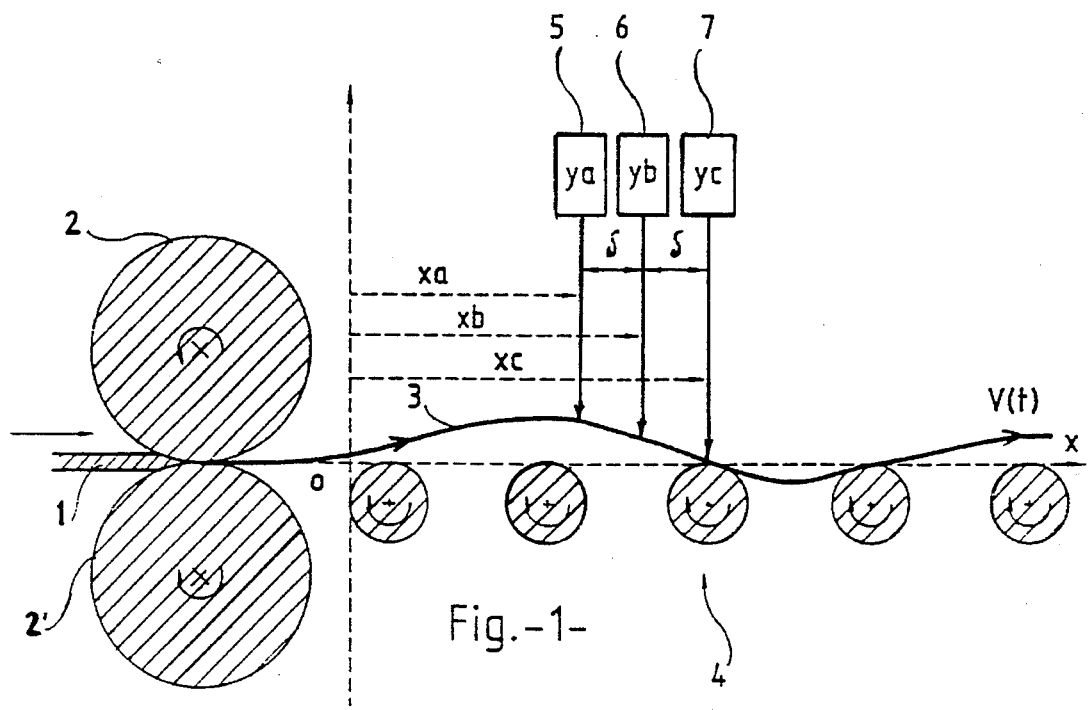
Fig.-1-
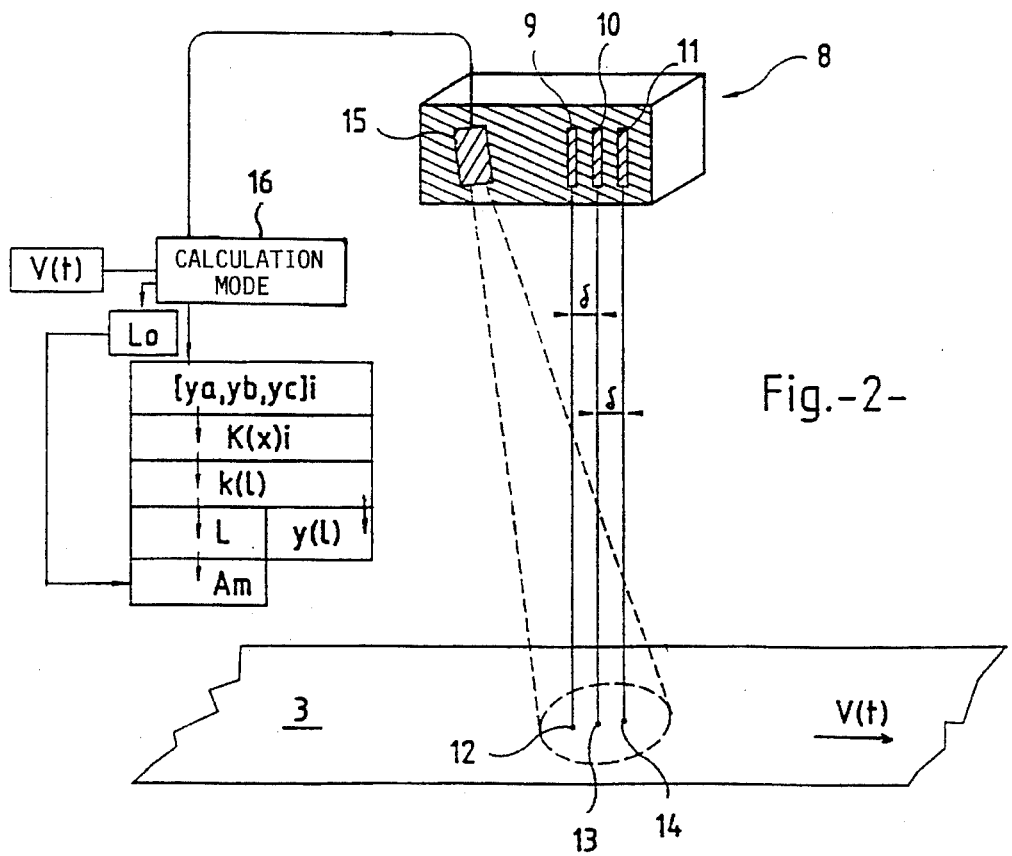
Fig.-2-

METHOD OF MEASURING THE SHAPE AND/OR THE PLANARITY OF A RUNNING MATERIAL, AND DEVICE FOR ITS IMPLEMENTATION

FIELD OF THE INVENTION

The invention relates to the measurement of the shape and/or the planarity of running materials, especially metal sheets and strips as they are being rolled.

Prior Art

A metal sheet or metal strip, especially one that is made of steel, having just been rolled, is said to be "flat" if its surface exhibits no macroscopic deviations with respect to a horizontal plane when the product is arranged in this plane, and is subjected to no other force than its own weight. If, under these conditions, deviations of its surface are observed, it is then said that this product exhibits a planarity defect. Planarity defects are called "developable" when they correspond to simple deformations for which all the surface fibers of the strip preserve substantially the same length as the central fiber of the strip (that is to say the surface fiber located in the middle of the strip). Defects called "nondevelopable" defects result from significant differences in length in the region thereof between the various surface fibers and the central fiber of the strip. They are caused by a defect of homogeneity of the thickness reduction of the product over the width of the strip, due, for example, to an exaggerated concavity or an exaggerated convexity of the rolls performing the rolling. The least serious planarity defects may be corrected during the subsequent steps of the rolling, for example by a leveller for heavy sheets or a skinpass mill for cold-rolled strips. However, it is important to detect these defects as soon as they are formed so as rapidly to remedy the problems which cause them.

The nonplanarity of a strip is quantified in the following way. Considering, over a given distance L measured in a reference plane, the length L+ΔL of a longitudinal fiber of the strip (along the rolling direction), the ratio $A_m = \Delta L/L$ is calculated. This ratio defines the "elongation ratio" of the fiber with respect to an undistorted fiber which would lie in the reference plane. The greater this ratio the more pronounced the planarity defect is. Another useful quantity to calculate is the "planarity index" $P_m$ of a surface fiber of the strip. Taking $A_m$ as the elongation ratio of this surface fiber and $A_c$ as the elongation ratio of the central fiber, then $P_m = (A_m - A_c)/A_c$. A nonzero planarity index $P_m$ implies a different elongation ratio between the surface fiber and the central fiber, this being the result of the nondevelopable nature of the planarity defect detected.

Satisfactory determination of the elongation ratio and of the planarity index of a fiber cannot be envisaged without an accurate measurement of the shape of this fiber. It is therefore necessary, before any calculation relating to the planarity of the fiber, to obtain beforehand, if not this very shape, at least the data which make it possible to achieve this. In practice, most devices for measuring planarity also afford access to the shape of the fiber, taking advantage from the fact that the data to be acquired are the same for both functions. In fact, in order to pass from one function to the other, it is only necessary to modify a few final steps in the processing of these data.

Conventionally, access is gained to the shape and/or planarity of a sheet or a strip by arranging a battery of telemeters above the product, in a straight line transverse with respect to its running direction. Each of these telemeters measures periodically the height of a surface longitudinal fiber of the product as it runs past. By storing the results of the measurements and by combining them with the running speed of the product, an approximate image of the shape of the fiber, assimilated into a series of straight line segments, is obtained. From the data thus acquired, an approximate measurement of the length of the said fiber may be also be calculated. The drawback of this mode of operation is that, in fact, the height of the surface fiber at a given instant is modified not only by its actual shape but also by the amplitude of the vibratory motions of the product which are added to its translational motion. These vibratory motions have a purely vertical component, and also an angular component, resulting from incipient rotation of the product (lift up, for example). They cause, between two measurements, a movement of the fiber which has nothing to do with the actual shape of the fiber and the planarity of the product, but which nevertheless is taken into consideration by the telemeter. These parasitic movements generally introduce a very appreciable error into the measurements of the shape and of the length of the fiber and, consequently, that of its elongation ratio A. However, if it is not the elongation ratio of the fiber but its planarity index $P_m$ that is desired to be known, this method may give acceptable results since the measurement errors in $A_c$ and $A_m$ tend to be compensated during the calculation of $P_m$.

An improvement in this method consists in using, in order to evaluate the shape and the length of a given fiber, not one but two telemeters, offset by a known distance Δx, which simultaneously carry out the measurement of the height of the fiber to their vertical. If the difference between the heights measured simultaneously by the two telemeters is called Δh, the length Δl of the fiber between the two telemeters is evaluated (per defect) from $\Delta l = \sqrt{\Delta^2 + \Delta x^2}$. By summing the measured Δl values, access is gained to an evaluation of the total length of the fiber which is independent of the uncertainties due to the purely vertical component of the movements of the product. However, the angular component still falsifies the measurements.

Another method consists (see the document JP 62-172210) in using an optical cutting method in which the product is illuminated by three inclined laser planes which cut a given fiber at three points A, B, C, and the images of which are picked up by a linear camera having photosensitive elements (CCD camera). The planarity measurement is based on an index E taking into account the distances AB, BC and AC, calculated from the images picked up by the CCD camera, where E=(AB+BC−AC)/AC.

This index ε is comparable to the previous elongation ratio $A_m$ and has the advantage of not involving an independent reference plane of the product in calculating it. However, it is valid only if the defect detected has the same wavelength over the entire width of the product, which may be nothing of the kind. In addition, it is necessary to have absolute knowledge of the distance between the measurement points, which currently available equipment does not make it possible to obtain satisfactorily.

SUMMARY OF THE INVENTION

The object of the invention is to propose a more reliable and more accurate method than the previous methods for evaluating the shape and/or the planarity of a running sheet or strip.

For this purpose, the subject of the invention is a method of measuring the shape of a longitudinal fiber of a running strip, such as a metal strip as it is being rolled, in which method readings are taken of the running speed (V(t)) of the said strip and of the heights ($Y_i$) of a set of n points of index (i) of the said fiber in a predetermined reference frame (xOy), the axis (Ox) of which is oriented along the running direction of the said strip, and a function (y(l)) depending on the shape of the said fiber is determined from the said heights ($y_i$) and the said speed (V(t)), which method comprises, when readings are taken of the height of the point of index (i) of the said fiber, located at a distance (l) from the point of index 1 of the said fiber, measured along the axis (Ox), taking simultaneous readings of the heights of at least two other points which are close to it and are located on either side of it, calculating the curvature $(K(x)_i)$ of the said fiber in the vicinity of the said point of index i approximately using the said heights, then, using the curvatures calculated for the said points, determining a function (k(l)) representing the change in the curvature of the said fiber between the said points of index i and index n, and, by successive integrations of the said function (k(l)), determining a function (Y(l)) representing the actual shape of the said fiber between the said points of index 1 and index n.

The subject of the invention is also a method of measuring the planarity of a longitudinal fiber of a running strip, such as a metal strip as it is being rolled, in which method readings are taken of the running speed of the said strip and of the heights ($Y_i$) of a set of n points of index (i) of the said fiber in a predetermined reference frame (xOy), the axis (Ox) of which is oriented along the running direction of the said strip, and the length (L) of the said fiber between the point of index I and the point of index n and the length (Lo) of its projection on the said axis .(Ox) are calculated approximately from these readings taken, and the elongation ratio ($A_m$=(L–Lo)/Lo) of the said fiber, representing its planarity, is calculated, wherein the said function k(l) is determined as explained previously, and the length (L) of the said fiber between the said points of index i and index n is calculated by successive integrations of the said function k(l).

The subject of the invention is also devices permitting implementation of these methods, or of only one of them, including, especially, means for taking readings of the heights ($y_i$) of a set of n points of index i of the said fiber, and means for simultaneously taking readings of the heights of at least two other points of the said fiber flanking each point of index i, thus rendering possible the calculation of the curvature $K(x)_i$ of the said fiber in the vicinity of each point of index i.

As will be understood, the invention consists in measuring the shape and/or the length of a fiber of the product no longer by assimilating this shape into a series of straight line segments, but into a series of curved segments, the calculated curvatures of which approximate more closely to the actual curvatures of the corresponding segments of the fiber. A representation of the shape and a measurement of the length of the fiber are thus obtained with a much greater accuracy, particularly when the planarity defects have a short wavelength. This is possible by virtue of the use of a telemeter having three measurement points or of an equivalent device. Influences having a deleterious effect on the accuracy of the measurement of the vertical and angular components of the movement of the product are thereby circumvented.

BRIEF DESCRIPTION OF THE DRAWINGS

The invention will be better understood on reading the description which follows, with reference to the following appended Figures:

FIG. 1 which represents diagrammatically the principle of the measurement of the length and/or the planarity of a portion of a fiber of a running strip, which is the basis of the method according to the invention;

FIG. 2 which represents diagrammatically an example of a device for the implementation of the method according to the invention.

FIG. 1 depicts, very diagrammatically, the principle of the method of measuring the length and/or the planarity of a strip according to the invention. It shows, in longitudinal section in a vertical plane, a sheet 1 which penetrates into and progresses through the nip of two rotating mill rolls 2, 2' in order to be rolled therein. It emerges from the nip in the form of a strip 3 of smaller thickness, running along a roller table 4. FIG. 1 shows that the longitudinal fiber of the strip 3 which is located in the cutting plane exhibits a planarity defect (obviously of very exaggerated amplitude for the requirements of the demonstration). FIG. 1 also shows a reference frame xOy in which the measurements which are to be mentioned will be carried out. The axis Ox of this reference frame is located in the cutting plane of FIG. 1. It is, for example, coincident with what would be the nominal path of the longitudinal fiber of the strip 3 located in this cutting plane if this fiber were strictly rectilinear. The axis Oy is an axis perpendicular to Ox and included in the cutting plane. According to the invention, arranged above the fiber of the strip 3 in question is a set of three measurement instruments 5, 6, 7, the measurement axes of which, preferably equally spaced by a length δ, enable the heights $y_a$, $y_b$, $y_c$ of three points of the fiber in the reference frame xOy to be obtained respectively. These points are themselves located respectively at distances $x_a$, $x_b$, $x_c$ from the point 0 chosen arbitrarily as the origin of the reference frame, with $X_c - X_b = X_b - X_a = \delta$.

As will be explained, the measurements carried out by these instruments will render possible the calculation, to a satisfactory approximation, of the shape and the total length of the fiber which has run through the measurement zone between two given instants.

It is assumed that the curvature of the fiber is uniform during a measurement in the zone in question. This approximation is acceptable since the planarity defects of the strip 3, if they are considered approximately as sinusoids, have a long wavelength (generally between 750 and 3000 mm), and the distance δ separating the measurement axes of the instruments 5, 6, 7 is comparatively short, of the order of a few tens of a millimeter. The curvature k(x) of the fiber is defined mathematically by:

$$k(x) = \frac{\frac{d^2y}{dx^2}}{\left(1 + \frac{d^2y}{dx^2}\right)^{3/2}}$$

Two measurements of the derivative of the function y=f(x) in the measurement zone at the instant of measurement are:

$$\frac{dy}{dx} = \frac{y_c - y_b}{\delta} \quad et \quad \frac{dy}{dx} = \frac{y_b - y_a}{\delta}$$

The rate of variation of this derivative in the measurement zone is also measured, namely $$\frac{d^2y}{dx^2} = \frac{d\left(\frac{dy}{dx}\right)}{dx} = \frac{1}{\delta}\left(\frac{y_c - y_b}{\delta} - \frac{y_b - y_a}{\delta}\right)$$

that is: $\frac{d^2y}{dx^2} = \frac{1}{\delta^2}(y_c - 2y_b + y_a)$

An approximate measurement $K(x)$ of the curvature of the fiber in the measurement zone from the readings taken by the three telemeters is therefore:

$$K(x) = \frac{\frac{1}{\delta^2}(y_c - 2y_b + y_a)}{\left(1 + \frac{1}{\delta^2}(y_c - 2y_b + y_a)\right)^{3/2}}$$

In practice, since the radius of curvature of a fiber is very large compared to $\delta$ and to the measured variations in y, $d^2y/dx^2$ may be neglected compared to 1, which allows the following to be written:

$$k(x) \approx \frac{d^2y}{dx^2}$$

and $$K(x) = \frac{1}{\delta^2}(y_c - 2y_b + y_a)$$

Thus a series of n samplings of index i are produced, making it possible to acquire triplets $(Y_a, Y_b, y_c)_i$, separated by time intervals which are a function of the running speed of the strip 3. A file of measurements is thus obtained, making it possible to determine, for each sampling of index i:

—the height $y_i$ of the fiber in the reference xOy: this height is taken as being equal to $Y_b$, that is to say the height of the central point of the measurement zone involved during the sampling of index i;

—the curvature $K(x)_i$ of the fiber in this measurement zone centered on the point of height $Y_b$, taken as being equal to $$K(x)_i = \frac{1}{\delta^2}(y_c - 2y_b + y_a).$$

Knowing the time interval, between each sampling, as well as the speed $V(t)$ of the strip 3 between these samplings, the file of measurements makes it possible to obtain, from the heights $y_i$, as in the known methods of measuring the shape and the planarity of a fiber, a function $y=f(l)$ representing the change in the measured height of the fiber over the portion of the strip 3 which has run past under the measurement instruments 5, 6, 7 between the first sampling (of index 1) and the last sampling involved (of index n). The quantity l is defined as follows. The length of the said portion of the strip 3 is called Lo and is taken to be equal to the length of the projection of the fiber on the axis Ox. Lo is therefore the same for all the fibers of the strip 3 and represents the reference length of the strip 3, with respect to which the elongation ratios of the various fibers are calculated. At a given instant, l, lying between 0 and Lo, represents the reference length of the strip 3 which has run past underneath the measurement instruments 5, 6, 7 since the first sampling. However, contrary to the known methods, according to the invention, it is not directly from this function y(l) that the shape and the planarity of the fiber will be obtained. The reason for this is that the procedure involves passing via a function k(l) representing the change in the curvature of the fiber over the portion of the strip in question and obtained in a similar way to y(l) from the calculated local curvatures $K(x)_i$ and the speed $V(t)$. Thus:

$$k(l) = \frac{d^2Y(l)}{dl^2},$$

Y(l) being a function which represents the variations in height of the fiber which are due solely to the variations in the curvature of the fiber and which function is independent (contrary to y(l)) of the variations in height which would be due only to vertical or angular motions of the strip 3.

A first numerical integration of the function k(l) makes it possible to get right back to the derivative of the function Y(l):

$$\frac{dY}{dl} = \int k(l)dl$$

By a second integration, the length L of the fiber may be deduced using the conventional formula giving the length of an arc of a curve Y=f(l)

$$L = \int_o^{Lo} \sqrt{1 + \left(\frac{dY}{dl}\right)^2}$$

And the elongation ratio $A_m$ of the fiber is deduced therefrom using:

$$A_m = \frac{L - Lo}{Lo}$$

Access may also be gained to the function Y(l) which makes it possible to get back to the very shape of the fiber, and this function Y(l) may be displayed for the operator, for example in the form of an image appearing on a screen.

The function y(l) here is only a calculation intermediate for the determination of the shape and the elongation ratio of the fiber: nevertheless, it may be advantageous to know it in order to deduce therefrom the influence of the parasitic motions of the product by comparing it with Y(l).

Up to now, measurements made using a set of three measurement instruments 5, 6, 7 have been considered, but it would be possible to make them with a larger number of instruments in order to have an even greater accuracy in the calculation of the curvature of the fiber. Preferably, there should be an odd number of these instruments so that the measurement zone involved exhibits a symmetry with respect to the point chosen as reference for the determination of the height of the fiber.

In order to evaluate the shape and the planarity of the strip 3 over its entire width, it is necessary to arrange above it a plurality of sets of instruments such as the one which has been described, so as to determine the elongation ratio $A_m$ of a multiplicity of fibers. If the central fiber of the strip, the elongation ratio of which is $A_c$, is among these fibers, it is possible, in addition, to calculate the planarity index $P_m = (A_m - A_c)/A_c$ of each of the other fibers.

Another advantage of the methods according to the invention is that, since the calculations are carried out on the basis of heights $Y_a$, $Y_b$, $Y_c$, all readings taken at the same instant, and that only differences between these heights are considered, errors which would be due to a slight variation in the position of the telemeter with respect to the strip 3 are also circumvented. Such variations may occur, for example, in the event of expansion of the support of the telemeter under the effect of radiation from the hot strip. It is sufficient merely for the distances between the measurement axes of the instruments 5, 6, 7 to remain constant over time.

Description of the preferred embodiment

A practical embodiment example of an apparatus for the implementation of the methods according to the invention, such as the one depicted in FIG. 2, will now be described.

This embodiment rests on the known principle of measuring a distance or its variation by image triangulation. A light beam generated by a laser source is directed onto the surface of an object and the image of the impact of the beam on this surface is picked up by an optical receiver, such as a diode camera. After calibrating, the value of the variations in height of this impact may be deduced from the movements of the image in the receiver.

The embodiment depicted diagrammatically in FIG. 2 rests on the use of a telemeter 8 held above the strip 3 by a support, not depicted, and possessing, contained in a case depicted in section:

—three lasers 9, 10, 11, the beams of which are parallel, spaced apart by a distance δ, and directed onto the surface of the strip 3 so as to produce, on one of its longitudinal fibers, three impacts 12, 13, 14 aligned in the direction of movement of the strip 3 which runs at a speed V(t) which is known at any instant and which is possibly variable.

—a linear camera 15, such as a CCD camera, which is pointed at the said impacts 12, 13, 14 and the field of which is sufficiently wide to encompass all of them, regardless of their height, taking account of the deformations and possible movements of the strip 3.

The camera 15 is connected to a calculation module 16 to which this camera sends the information which it picks up on the position of the impacts 12, 13, 14. The calculation module 16 is provided with a clock which controls the periodicity of the sampling of this information. It also records, at any instant, the value of the running speed V(t) of the strip 3. For each sampling of measurements of index i, by comparison between the data picked up by the camera 15 on the positions of the impacts 12, 13, 14 and the data picked up during a prior calibrating phase which it has stored in memory, the calculation module can determine the respective heights $[y_a, y_b, y_c]_i$ of the impacts 12, 13, 14, as they were defined previously. On the basis of these samplings, the last n of which are stored in memory, the calculation module carries out the previously described mathematical operations. These lead to the calculation of the curvatures $K(x)_i$ of the fiber in the region of the various measurement points over the length L of the fiber of the strip 3 which has run past the telemeter between the samplings of index i to n, and the reference length Lo deduced from V(t). The function k(l) is then determined, and, next, either the function Y(l) or the length L and the elongation ratio $A_m$ of the fiber, or both these data. At least one of these data is displayed for the operator responsible for operating the mill, so that he can take into account the presence of possible planarity defects on the fiber examined. Optimally, these data are also sent to the installation for regulating the rolling conditions so that it controls the execution of the actions which will permit these defects to be remedied.

In practice, 5 mW He-Ne lasers, each arranged approximately 2 m above the strip, may be used. The separation δ of the laser beams is, for example, 50 mm. The samplings are separated in time by the clock in such a way that a length of product approximately equivalent to this separation δ runs past the telemeters between two samplings.

As has been stated, preferably several telemeters 8, each possessing their calculation unit 16 (or connected to the same calculation unit processing and displaying separately the data which they transmit) have to be distributed over the width of the strip 3 in order to evaluate the shape and the planarity of several fibers. It is thus possible to obtain an overall image of the planarity of the strip, preferably taking into account the central fiber in order to render possible, in addition, the calculation of the planarity index Pm of each fiber, from $P_m=(A_m-A_c)/A_c$, ($A_c$ being the elongation ratio of the central fiber). Optimally, the telemeters may be designed to be able to move on their support in a direction transverse to the direction of movement of the strip 3, so as to be able to measure the planarity of any fiber of the strip 3. It is thus possible to evaluate the precise lateral extent of a planarity defect and to identify the fiber on which its amplitude is the greatest.

It will be well understood, on reading this description, that the various methods according to the invention are based on the same starting idea, namely that a longitudinal fiber of a strip in motion may be described on the basis of readings taken of its curvature at various points, so as to be independent of the erratic movements of the strip. It is on the basis of these readings taken that it is possible to calculate, depending on the wishes of the user, either the actual shape of the fiber or its length, and hence the conventional parameters representing its planarity, or, preferably, all these quantities at the same time. Likewise, it will be understood that the various individual devices according to the invention differ only by the programming mode of the final stages of the calculation module 16 and that, here too, depending on the wishes of the user, these devices may be easily adapted to the implementation of only one of these methods, or of both simultaneously.

Of course, the invention is not limited to the embodiment example which has just been described. In particular, means of measuring the quantities $Y_a$, $Y_b$, $Y_c$ other than image triangulation telemeters may be used. In addition, it is not limited to the measurement of the shape and the planarity of a running steel sheet or strip, but may relate to the measurement of the shape and the planarity of any, metallic or non-metallic, running material.

We claim:

1. Method of measuring the shape of a longitudinal fiber of a running strip, such as a metal strip as it is being rolled, in which method readings are taken of the running speed (V(t)) of the said strip and of the heights ($y_i$) of a set of n points of index (i) of the said fiber in a predetermined reference frame (xOy), the axis (Ox) of which is oriented along the running direction of the said strip, and a function (y(l)) depending on the shape of the said fiber is determined from the said heights ($y_i$) and the said speed (V(t)), which method comprises, when readings are taken of the height of the point of index (i) of the said fiber, located at a distance (l) from the point of index 1 of the said fiber, measured along the axis (Ox), taking simultaneous readings of the heights of at least two other points which are close to it and are located on either side of it, calculating the curvature $(K(x)_i)$ of the said fiber in the vicinity of the said point of index i approximately using the said heights, then, using the curvatures calculated for the said points, determining a function (k(l)) representing the change in the curvature of the said fiber between the said points of index 1 and index n, and, by successive integrations of the said function (k(l)), determining a function (Y(l)) representing the actual shape of the said fiber between the said points of index 1 and index n.

2. Method of measuring the shape of a running strip, such as a metal strip as it is being rolled, in which the shape of a plurality of longitudinal fibers of the said strip is measured, wherein the said shapes are measured by the method as claimed in claim 1.

3. Method of measuring the planarity of a longitudinal fiber of a running strip, such as a metal strip as it is being rolled, in which method readings are taken of the running speed of the said strip and of the heights $(y_i)$ of a set of n points of index (i) of the said fiber in a predetermined reference frame (xOy), the axis (Ox) of which is oriented along the running direction of the said strip, and the length (L) of the said fiber between the point of index i and the point of index n and the length (Lo) of its projection on the said axis (Ox) are calculated from these readings taken, and the elongation ratio $(A_m=(L-Lo)/Lo)$ of the said fiber, representing its planarity is calculated, wherein the said function k(l) is determined as in the method as claimed in claim 1, and the length (L) of the said fiber between the said points of index i and index n is calculated by successive integrations of the said function k(l).

4. Method of measuring the planarity of a running strip, such as a metal strip as it is being rolled, in which method the planarity of a plurality of longitudinal fibers of the said strip is measured, wherein the elongation ratio $(A_m)$ of each of the said fibers is measured by the method as claimed in claim 3.

5. Method as claimed in claim 4, wherein the elongation ratio $(A_c)$ of the central fiber of the said strip is measured and wherein the planarity index $(P_m=(A_m-A_c)/A_c)$ of each of the said longitudinal fibers is calculated.

6. Device for the measurement of the shape of a longitudinal fiber of a running strip (3), such as a metal strip as it is being rolled, comprising means (8) for taking readings of the heights $(y_i)$ of a set of n points of index (i) of the said fiber in a predetermined reference frame (xOy), means (16) for storing the said heights $(y_i)$ in memory, means for continuously recording the speed (V(t)) of the said strip (3), and means (16) for determining, from the said heights $(y_i)$ and the said speed V(t), a function (y(l)) depending on the shape of the said fiber, wherein the means (8) for taking readings of the heights $(y_i)$ also comprise means for simultaneously taking readings of the heights of at least two other points of the said fiber encircling each point of index i and wherein it also comprises means (16) for calculating the curvature $(K(x)_i)$ of the said fiber in the vicinity of each point of index i, means for determining a function (k(l)) , representing the change in the curvature of the said fiber between the said points of index 1 and index n, from the said curvatures $(K(x)_i)$ and means (16) for determining a function (Y(l)), representing the actual shape of the said fiber, from the said function (k(l)).

7. Device for the measurement of the planarity of a longitudinal fiber of a running strip, such as a metal strip as it is being rolled, comprising means for taking readings of the heights $(Y_i)$ of a set of n points of index (i) of the said fiber in a predetermined reference frame (xOy), means for storing the said heights $(Y_i)$ in memory, means for continuously recording the speed (V(t)) of the said strip, and means for calculating, from these heights, the length (L) of the said fiber between the point of index 1 and the point of index n and the length (Lo) of its projection on the said axis Ox, so as to be able to deduce therefrom the elongation ration $(A_m=(L-Lo)/Lo)$ of the said fiber, representing its planarity, wherein the means for taking readings of the heights $(Y_i)$ allows the taking of readings simultaneously of the heights of at least two other points of the said fiber in order to calculate the said lengths (L) and (Lo) and comprise means for calculating the curvature $(K(x)_i)$ of the said fiber in the vicinity of each point of index i, means for determining the function (k(1)), representing the change in the curvature of the said fiber between the said points of index 1 and index n, from the said curvatures $(K(x)_i)$ and means for determining a function (Y(1)), representing the actual shape of the said fiber, from the said function (k(1)).

8. Device as claimed in claim 6, wherein the said means (8) for taking readings of the heights $(y_i)$ comprise a telemeter possessing at least three lasers (9, 10, 11), the beams of which are parallel and directed onto the said longitudinal fiber of the said strip (3) and a linear camera (15) pointed in the direction of the impacts (12, 13, 14) of the said beams on the said strip (3).

9. Device for the measurement of the shape and/or the planarity of a running strip, such as a metal strip that is being rolled, comprising several independent devices each measuring the shape and/or the elongation ratio (Am) of a longitudinal fiber of the said strip, wherein the said devices are of the type as claimed in claim 6.

10. Device as claimed in claim 9, wherein one of the said independent devices measures the elongation ratio $(A_c)$ of the central fiber of the said strip (3) and wherein the said independent devices possess means for calculating the planarity index $(P_m)$ of each of the said longitudinal fibers.

11. Device as claimed in claim 6, wherein the said means for taking readings of the heights $(Y_i)$ are provided with means allowing the movement of them along a direction transverse to the running direction of the said strip.

* * * * *

UNITED STATES PATENT AND TRADEMARK OFFICE
CERTIFICATE OF CORRECTION

PATENT NO. : 5,465,214

DATED : November 7, 1995

INVENTOR(S) : Francois Jeuniaux, Marc Malhomme, Jean-Marc Moretti and Gerard Haralamb It is certified that error appears in the above-indentified patent and that said Letters Patent is hereby corrected as shown below:

On the title page, item [73];

Please add --Societe Anonyme des Forges et Acieries de Dilling (Societe Anonyme)-- as an assignee of the present invention.

Signed and Sealed this

Fifteenth Day of April, 1997

Attest:

BRUCE LEHMAN

Attesting Officer     Commissioner of Patents and Trademarks